United States Patent
Hatsugai et al.

(10) Patent No.: US 10,480,424 B2
(45) Date of Patent: Nov. 19, 2019

(54) INTERNAL-COMBUSTION ENGINE VALVE TIMING CONTROL APPARATUS

(71) Applicant: HITACHI AUTOMOTIVE SYSTEMS, LTD., Hitachinaka-shi, Ibaraki (JP)

(72) Inventors: Kuninaga Hatsugai, Atsugi (JP); Kenji Sato, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/740,555

(22) PCT Filed: Jun. 8, 2016

(86) PCT No.: PCT/JP2016/067000
§ 371 (c)(1),
(2) Date: Dec. 28, 2017

(87) PCT Pub. No.: WO2017/002558
PCT Pub. Date: Jan. 5, 2017

(65) Prior Publication Data
US 2018/0187610 A1    Jul. 5, 2018

(30) Foreign Application Priority Data
Jun. 29, 2015   (JP) ................. 2015-130051

(51) Int. Cl.
*F01L 1/344*      (2006.01)
*F02D 13/02*      (2006.01)
(Continued)

(52) U.S. Cl.
CPC .......... *F02D 13/0215* (2013.01); *F01L 1/024* (2013.01); *F01L 1/3442* (2013.01); *F01L 1/356* (2013.01); *F01L 2001/3443* (2013.01); *F01L 2001/34433* (2013.01); *F01L 2001/34469* (2013.01); *F01L 2001/34479* (2013.01); *F01L 2001/34483* (2013.01);
(Continued)

(58) Field of Classification Search
CPC ... F01L 1/3442; F01L 2001/3445; F01L 1/46; F01L 2103/00
USPC ........................................ 123/90.15
See application file for complete search history.

(56) References Cited

U.S. PATENT DOCUMENTS

| 2011/0174252 A1* | 7/2011 | Tada ........ | F01L 1/024 |
| | | | 123/90.15 |
| 2013/0055975 A1* | 3/2013 | Bosel ........ | F01L 1/3442 |
| | | | 123/90.15 |

(Continued)

FOREIGN PATENT DOCUMENTS

| JP | 2014-163380 A | 9/2014 |
| JP | 2015-101969 A | 6/2015 |

(Continued)

*Primary Examiner* — Jorge L Leon, Jr.
(74) *Attorney, Agent, or Firm* — Foley & Lardner LLP

(57) ABSTRACT

Provided is a valve timing control apparatus, for an internal combustion engine, capable of sufficiently draining hydraulic oil from between a pulley and a housing body. The pulley includes a through-hole extending axially therethrough at a position radially outward with respect to the outer peripheral surface of the housing body. The through-hole is formed so as to extend over a bottom portion and cylindrical portion of the pulley.

15 Claims, 11 Drawing Sheets

(51) Int. Cl.
*F01L 1/356* (2006.01)
*F01L 1/02* (2006.01)

(52) U.S. Cl.
CPC ....... *F01L 2101/00* (2013.01); *F01L 2103/00* (2013.01); *Y02T 10/18* (2013.01)

(56) References Cited

U.S. PATENT DOCUMENTS

| | | |
|---|---|---|
| 2014/0230764 A1 | 8/2014 | Hentsch et al. |
| 2015/0361837 A1 | 12/2015 | Sugano et al. |
| 2016/0017768 A1* | 1/2016 | Brenner .............. F01L 1/3442 74/568 R |
| 2016/0273417 A1 | 9/2016 | Watanabe |

FOREIGN PATENT DOCUMENTS

| | | |
|---|---|---|
| WO | WO-2014/112456 A1 | 7/2014 |
| WO | WO-2015/087649 A1 | 6/2015 |

\* cited by examiner

INTERNAL-COMBUSTION ENGINE VALVE TIMING CONTROL APPARATUS

TECHNICAL FIELD

The present invention relates to timing control apparatus for internal combustion engine valve.

BACKGROUND ART

The following Patent Literature 1 discloses a technique of the type described above. PTL 1 discloses a camshaft adjuster in which a stator and a rotor are accommodated at the inner peripheral side of a cylindrical pulley to which rotation from a crankshaft is transmitted.

CITATION LIST

Patent Literature

PTL 1: Japanese Patent Application Laid-Open Publication No. 2014-163380

SUMMARY OF INVENTION

Technical Problem

With the technique disclosed in PTL 1, there is a gap between the inner peripheral surface of the pulley and the outer peripheral surface of the stator; therefore, hydraulic oil used to perform a performance test or the like may collect in the gap. Although the hydraulic oil is drained before shipment, it is likely that the hydraulic oil cannot be drained out sufficiently because the above-described space has no way out at one end of the gap.

The present invention has been made in view of the above-described problem, and an object of the present invention is to provide valve timing control apparatus, for an internal combustion engine, capable of sufficiently draining hydraulic oil from between a pulley and a housing body (stator).

Solution to Problem

To attain the above-described object, according to a first embodiment of the present invention, a pulley has a through-hole extending axially through the pulley at a position radially outward with respect to an outer peripheral surface of a housing body of the pulley. The through-hole is formed to extend over a bottom portion and a cylindrical portion of the pulley.

According to a second embodiment of the present invention, a pulley has a through-hole extending axially through the pulley at a position radially outward with respect to an outer peripheral surface of a housing body of the pulley. The through-hole is connected to an inner peripheral surface of a cylindrical portion without a step in a rotation axis direction of the pulley.

Accordingly, it is possible to sufficiently drain hydraulic oil between the pulley and the housing body.

DESCRIPTION OF EMBODIMENTS

First Embodiment

[Configuration of Valve Timing Control Apparatus]

Figure 1:
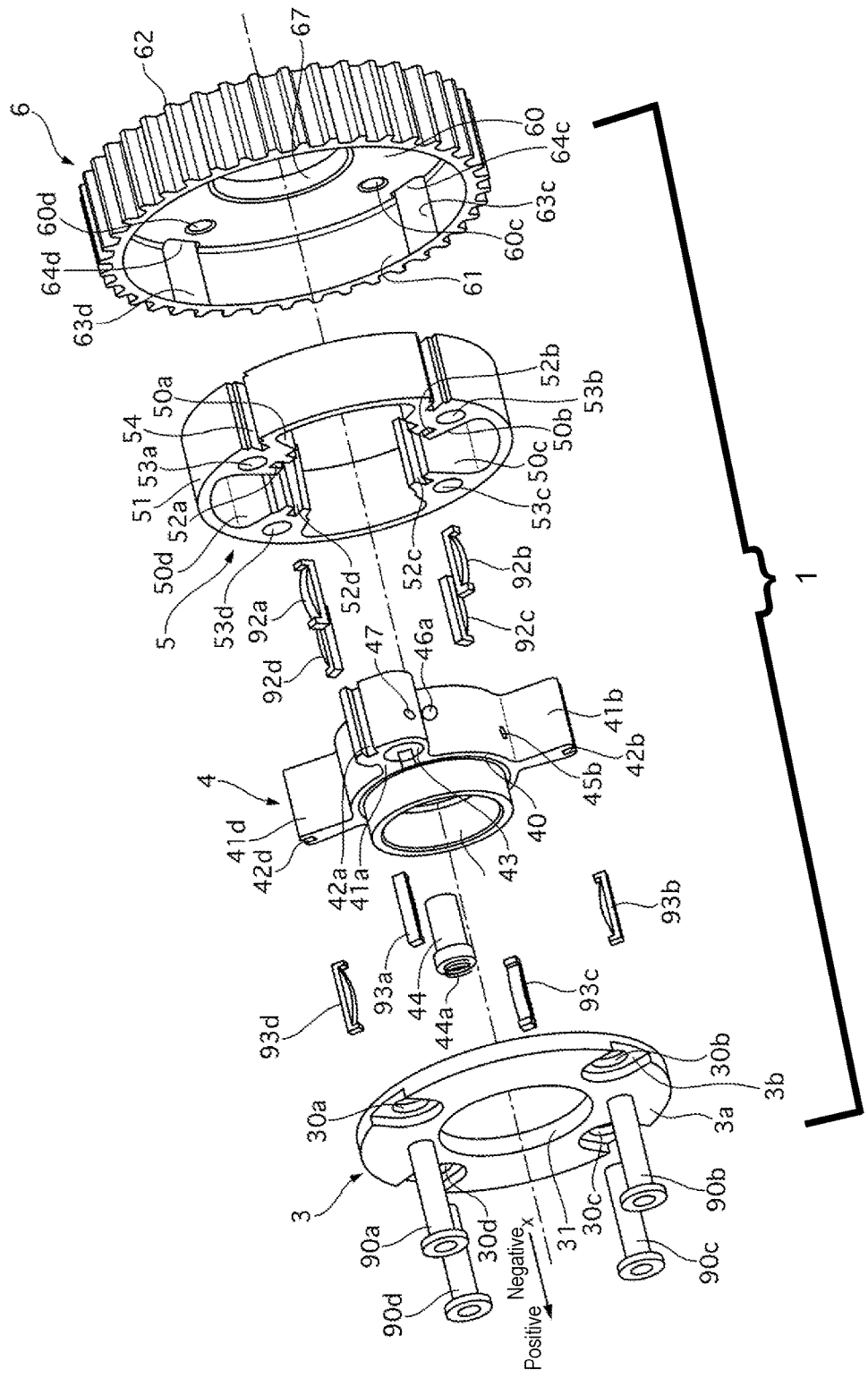
FIG. 1 is an exploded perspective view of a valve timing control apparatus according to a first embodiment.

A valve timing control apparatus 1 for an internal combustion engine according to a first embodiment is applied to the intake side of an internal combustion engine of an automobile. The valve timing control apparatus 1 is provided to an intake camshaft 2 to advance (advance angle) or retard (retard angle) the rotational phase of the intake camshaft 2 relative to a crankshaft.

The configuration of the valve timing control apparatus 1 will be explained using FIGS. 1 to 9. In the following explanation, an X-axis is set in the rotation axis direction of the valve timing control apparatus 1. In addition, a direction toward a side at which a front plate 3 is provided is set as an X-axis positive direction, and a direction toward a side at which a bottom portion 60 of a pulley 6 is provided is set as an X-axis negative direction (see FIG. 1).

Figure 2:
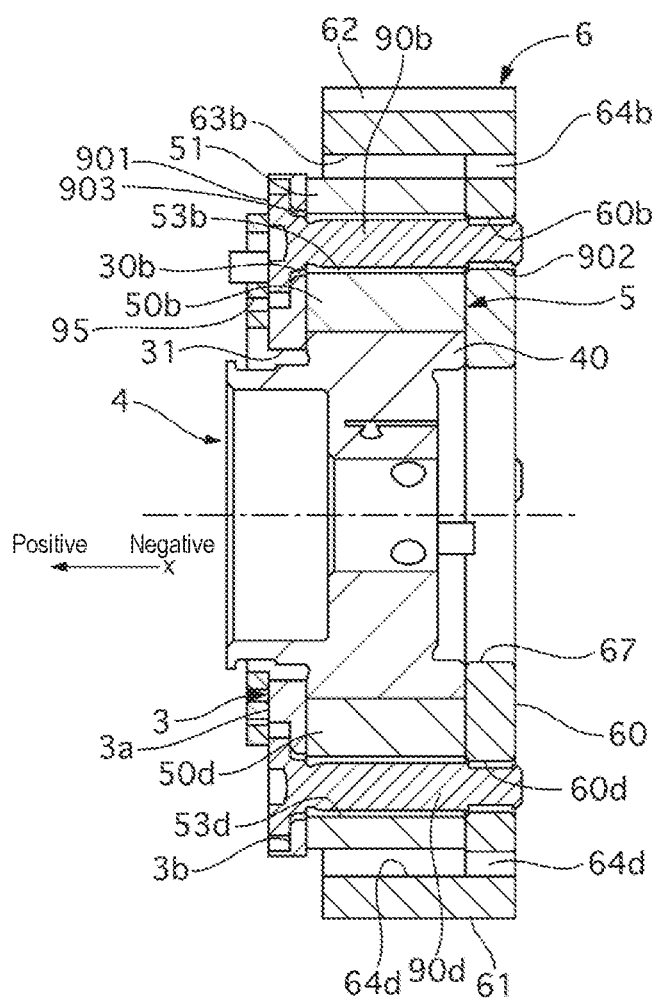
FIG. 2 is a sectional view of the valve timing control apparatus according to the first embodiment along the rotation axis direction.
Figure 3:
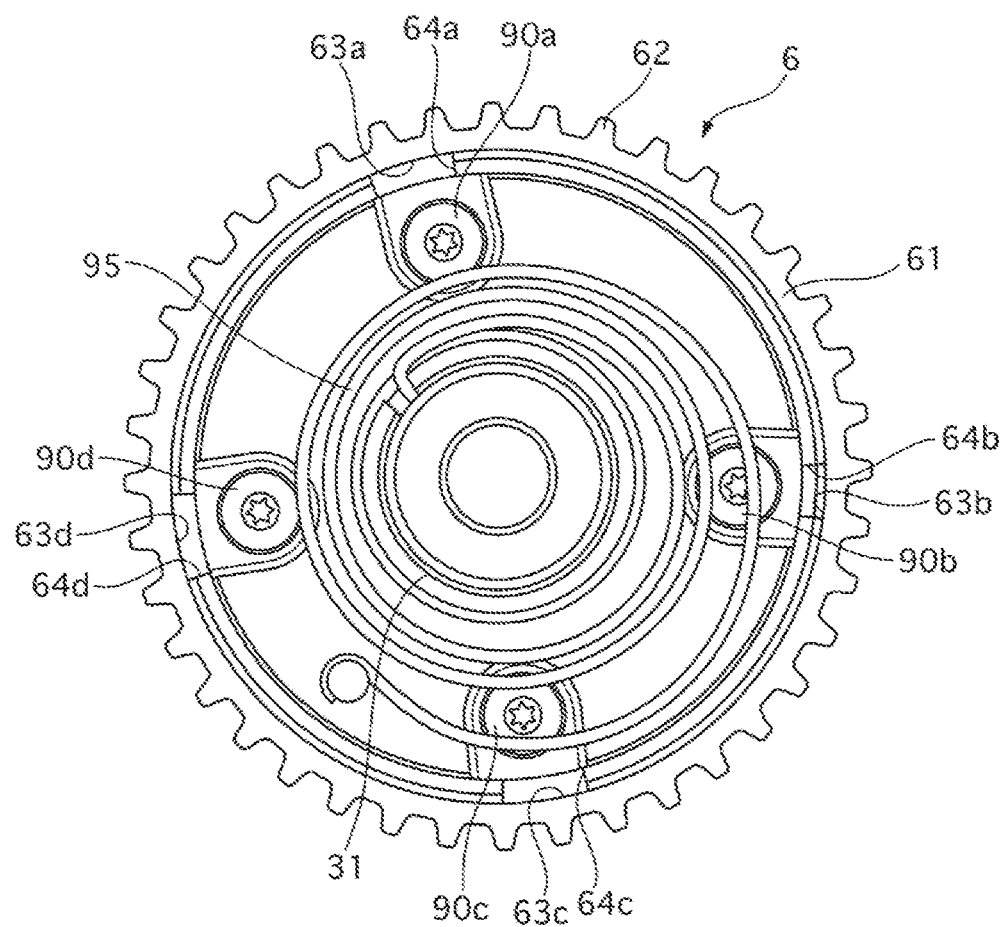
FIG. 3 is an illustration of the valve timing control apparatus according to the first embodiment as viewed from the axis direction.
Figure 4:
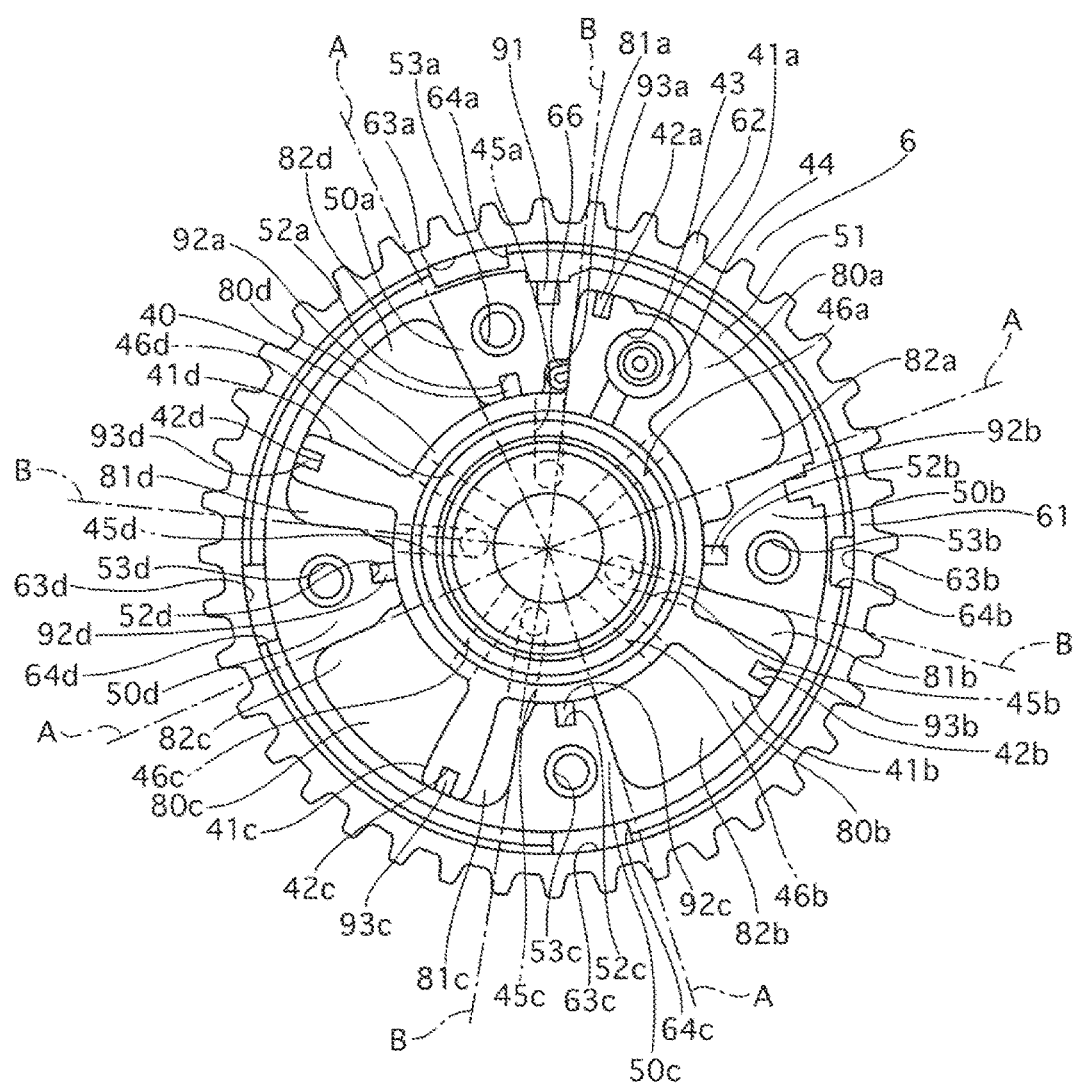
FIG. 4 is an illustration of the valve timing control apparatus according to the first embodiment as viewed from the axis direction.
Figure 5:
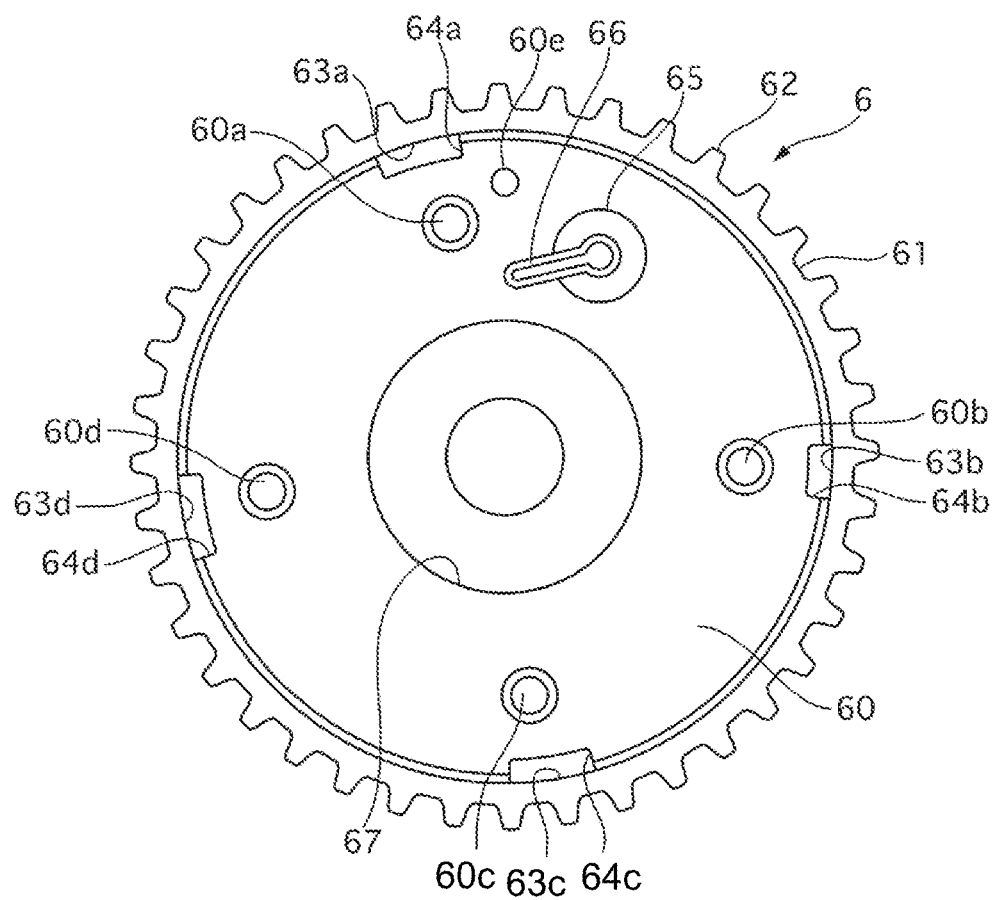
FIG. 5 is an illustration of a pulley in the first embodiment as viewed from the axis direction.
Figure 6:
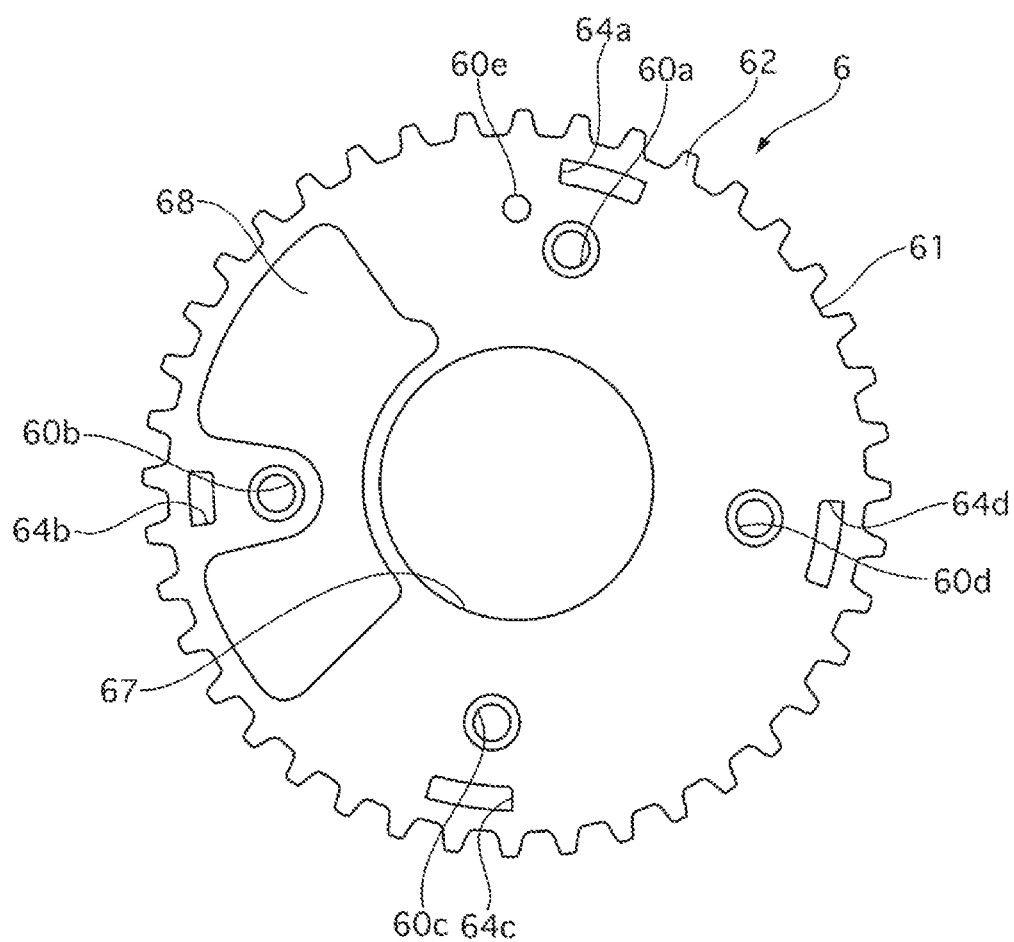
FIG. 6 is an illustration of the pulley in the first embodiment as viewed from the axis direction.
Figure 7:
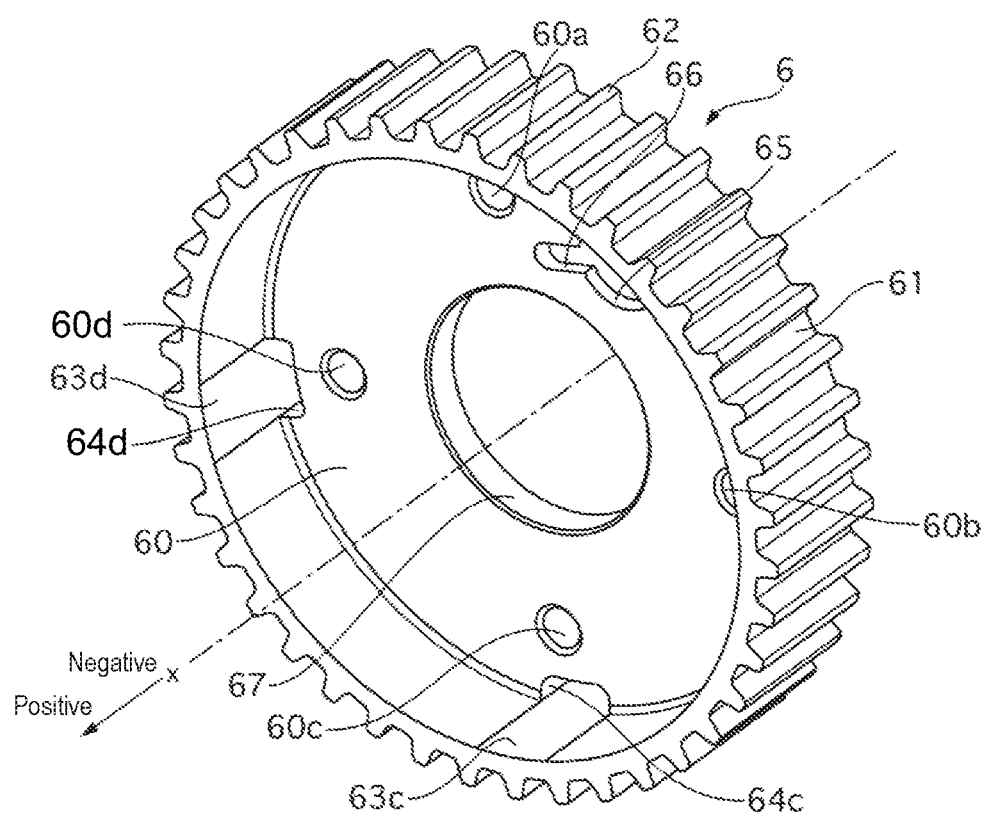
FIG. 7 is a perspective view of the pulley in the first embodiment.
Figure 8:
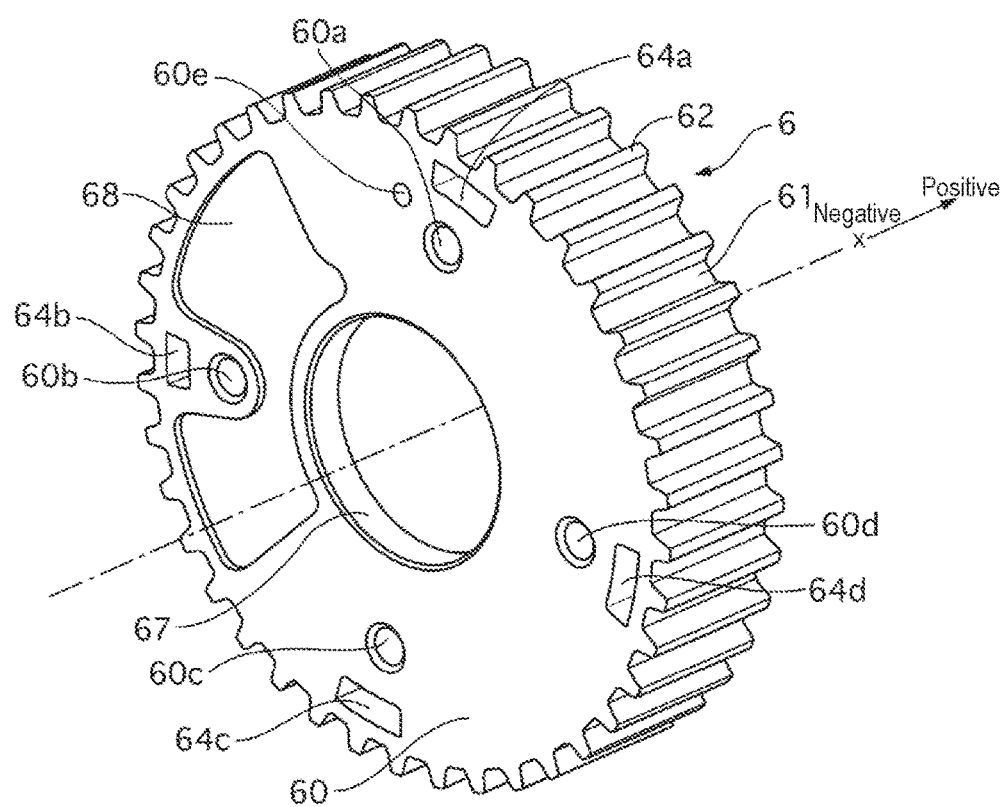
FIG. 8 is a perspective view of the pulley in the first embodiment.
Figure 9:
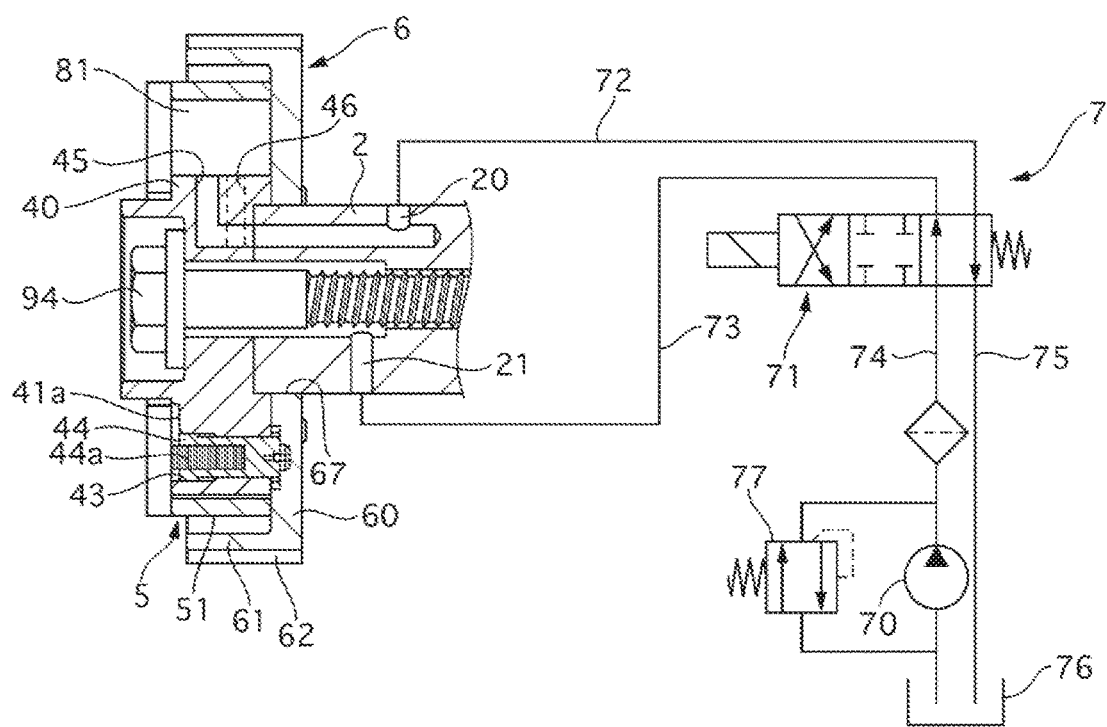
FIG. 9 shows a hydraulic circuit of hydraulic oil in the first embodiment.

FIG. 1 is an exploded perspective view of the valve timing control apparatus 1. FIG. 2 is a sectional view of the valve timing control apparatus 1 along the rotation axis direction. FIG. 3 is an illustration of the valve timing control apparatus 1 as viewed from the X-axis positive direction. FIG. 4 is an illustration of a state in which the front plate 3 is removed from FIG. 3. FIG. 5 is an illustration of the pulley 6 as viewed from the X-axis positive direction. FIG. 6 is an illustration of the pulley 6 as viewed from the X-axis negative direction. FIG. 7 is a perspective view of the pulley 6. FIG. 8 is a perspective view of the pulley 6. FIG. 9 shows a hydraulic circuit for hydraulic oil.

The valve timing control apparatus 1 includes a front plate 3, a vane rotor 4, a housing body 5, and a pulley 6.

(Configuration of Pulley)

The pulley 6 is formed by sintering a metal material. The pulley 6 includes a cylindrical portion 61 formed in the shape of a cylinder and a bottom portion 60 closing opening on an X-axis negative direction side of the cylindrical portion 61.

Teeth 62 are provided on an outer peripheral side of cylindrical portion 61. A toothed belt is to be wound around the outer periphery of the cylindrical portion 61. The toothed belt is stretched between the pulley 6 and a crankshaft of an internal combustion engine. The outer periphery of the cylindrical portion 61 (i.e. an arc formed by connecting the distal ends of the teeth 62) is not a perfect circle but three portions smallest in diameter (smallest diameter portions) and portions largest in diameter (largest diameter portions) each provided between adjacent smallest diameter portions are smoothly connected.

The cylindrical portion 61 is provided on the inner peripheral side thereof with four grooves 63a to 63d extending in a groove shape in the X-axis direction. Through-holes 64a to 64d extending in the X-axis direction through the pulley 6 are provided so as to extend over the cylindrical portion 61 and the bottom portion 60. The grooves 63 are communicated with the inner peripheral surfaces of the through-holes 64, respectively. The grooves 63 and the through-holes 64 are formed by a sintering mold used when the pulley 6 is formed by sintering. The grooves 63 and the through-holes 64 will be detailed later.

A camshaft insertion hole 67 extends in the X-axis direction through the bottom portion 60 near the rotation axis center of the bottom portion 60. The intake camshaft 2 is inserted through the camshaft insertion hole 67. Internally threaded portions 60a to 60d extend in the X-axis direction through the bottom portion 60 at respective positions corresponding to bolt holes 53a to 53d formed in shoes 50a to 50d, respectively, of a housing body 5 (described later). The internally threaded portions 60a to 60d are engaged with bolts 90a to 90d, respectively, to jointly fasten the front plate 3, the housing body 5, and the pulley 6.

An engaging recess 65 is formed in an X-axis positive direction-side side surface of the bottom portion 60 to a predetermined depth in the bottom portion 60. The engaging recess 65 is formed with an advance angle chamber hydraulic pressure inlet groove 66 extending radially from the center of the engaging recess 65. The distal end of the advance angle chamber hydraulic pressure inlet groove 66 is open at a first advance angle chamber 81a (described later). The advance angle chamber hydraulic pressure inlet groove 66 is formed one step deeper than the engaging recess 65.

A pin hole 60e into which a positioning pin 91 is to be inserted is formed in the X-axis positive direction-side side surface of the bottom portion 60. The pin hole 60e is provided between the engaging recess 65 and the internally threaded portion 60a and slightly radially outward with respect to the engaging recess 65 and the internally threaded portion 60a. A reduced thickness portion 68 formed to a predetermined depth in the bottom portion is provided in an X-axis negative direction-side side surface of the bottom portion 60. The reduced thickness portion 68 is provided to extend over positions corresponding respectively to a first operation chamber 80a and a second operation chamber 80b (described later).

(Configuration of Housing Body)

The housing body 5 includes a cylindrical portion 51 formed in the shape of a cylinder and four shoes 50 projecting in an inner circumferential direction of the cylindrical portion 51.

The cylindrical portion 51 is formed with an outer diameter smaller than the diameter of a circle formed by connecting the inner periphery-side surfaces of the through-holes 64, which are formed in the bottom portion 60 of the pulley 6.

A first shoe 50a, a second shoe 50b, a third shoe 50c, and a fourth shoe 50d are provided at approximately equal intervals in clockwise order as the housing body 5 is viewed from the X-axis positive direction side. The shoes 50 are each formed with a width in the X-axis direction approximately equal to the width of the cylindrical portion 51. The circumferential width of each shoe 50 becomes approximately narrower radially inward.

The shoes 50 are provided at the distal ends thereof with seal engaging portions 52a to 52d, respectively, formed in the shape of grooves extending in the X-axis direction. The seal engaging portions 52a to 52d are engaged with seals 92a to 92d, respectively. Bolt holes 53a to 53d extend through the shoes 50 in the X-axis direction at respective positions radially inward with respect to the seal engaging portions 52a to 52d, respectively. Bolts 90a to 90d are inserted into the bolt holes 53a to 53d, respectively, to jointly fasten the front plate 3, the housing body 5, and the pulley 6.

A positioning groove 54 is formed on the outer peripheral side of the first shoe 50a. The positioning groove 54 is formed in the shape of a groove extending in the X-axis direction. When the housing body 5 is accommodated at the inner peripheral side of the cylindrical portion 61 of the pulley 6, the positioning pin 91 inserted through the pin hole 60e of the pulley 6 is inserted into the positioning groove 54. In this way, positioning of the housing body 5 with respect to the pulley 6 is performed.

(Configuration of Vane Rotor)

The vane rotor 4 includes a rotor 40 formed in the shape of a cylinder and four vanes 41 projecting in a circumferential direction of the rotor 40.

The rotor 40 has an outer diameter slightly smaller than the diameter of a circle formed by connecting the distal ends of the shoes 50 of the housing body 5. The seals 92 at the distal ends of the shoes 50 slidingly contact the outer peripheral surface of the rotor 40. The rotor 40 is fastened to the intake camshaft 2 with a bolt 94 (FIG. 9). Thus, the vane rotor 4 and the intake camshaft 2 rotate together as one unit.

A first vane 41a, a second vane 41b, a third vane 41c, and a fourth vane 41d are provided at approximately equal intervals in clockwise order as the vane rotor 4 is viewed from the X-axis positive direction side. The vanes 41 are each formed with a width in the X-axis direction narrower than the width of the rotor 40, so that the rotor 40 projects relative to the vanes 41 at the X-axis positive direction side thereof. The first vane 41a is formed with a circumferential width wider than the widths of the other vanes 41b to 41d. The circumferential width of each vane 41 becomes approximately narrower radially inward.

The first vane 41a is accommodated in a first operation chamber 80a formed by the inner peripheral surface of the cylindrical portion 51 of the housing body 5, the first shoe 50a, the second shoe 50b, and the outer peripheral surface of the rotor 40. The second vane 41b is accommodated in a second operation chamber 80b formed by the inner peripheral surface of the cylindrical portion 51 of the housing body 5, the second shoe 50b, the third shoe 50c, and the outer peripheral surface of the rotor 40. The third vane 41c is accommodated in a third operation chamber 80c formed by the inner peripheral surface of the cylindrical portion 51 of the housing body 5, the third shoe 50c, the fourth shoe 50d, and the outer peripheral surface of the rotor 40. The fourth vane 41d is accommodated in a fourth operation chamber 80d formed by the inner peripheral surface of the cylindrical portion 51 of the housing body 5, the fourth shoe 50d, the first shoe 50a, and the outer peripheral surface of the rotor 40.

The vanes 41 are provided at the distal ends thereof with seal engaging portions 42a to 42d, respectively, formed in the shape of grooves extending in the X-axis direction. The seal engaging portions 42a to 42d are engaged with seals 93a to 93d, respectively. The diameter of a circle formed by connecting the respective distal ends of the vanes 41 is slightly smaller than the inner diameter of the cylindrical portion 51 of the housing body 5. The seals 93 at the distal ends of the vanes 41 slidingly contact the inner peripheral surface of the cylindrical portion 51.

A cylinder 43 extending through in the X-axis direction is provided on the first vane 41a. A lock piston 44 is accommodated slidably in the X-axis direction in the cylinder 43. A coil spring 44a is provided at the X-axis positive direction side of the lock piston 44. The coil spring 44a abuts at the X-axis positive direction side thereof against the side surface of the front plate 3. The coil spring 44a biases the lock piston 44 toward the side surface of the bottom portion 60 of the pulley 6.

(Configuration of Front Plate)

The front plate 3 is formed in the shape of a disk and has a rotor inserting hole 31 extending therethrough in the X-axis direction near the rotation axis center thereof. A projecting portion of the rotor 40 at the X-axis positive direction side is inserted into the rotor inserting hole 31. Bolt holes 30a to 30d extend through the front plate 3 in the X-axis direction at the outer peripheral side with respect to the rotor inserting hole 31. The bolts 90a to 90d are inserted through the bolt holes 30a to 30d to jointly fasten the front plate 3, the housing body 5, and the pulley 6. Further, the front plate 3 is equipped with a spiral spring 95 biasing the rotor 40 in the advance angle direction relative to the housing body 5. The front plate 3 has an outer end surface 3a formed flat so that the spiral spring 95 is abutted against the outer end surface 3a. In other words, the outer end surface 3a serves as a bearing surface for the spiral spring 95. Further, the front plate 3 has recesses 3b formed therein to serve as bearing surfaces for the bolts 90a to 90d.

(Configuration of Hydraulic Circuit)

The first operation chamber 80a is divided by the first shoe 50a into a first advance angle chamber 81a and a first retard angle chamber 82a. The second operation chamber 80b is divided by the second shoe 50b into a second advance angle chamber 81b and a second retard angle chamber 82b. The third operation chamber 80c is divided by the third shoe 50c into a third advance angle chamber 81c and a third retard angle chamber 82c. The fourth operation chamber 80d is divided by the fourth shoe 50d into a fourth advance angle chamber 81d and a fourth retard angle chamber 82d.

The rotor 40 of the vane rotor 4 is provided with advance angle oil passages 45a to 45d communicating with the advance angle chambers 81, respectively. The advance angle oil passages 45 communicate with an advance angle oil passage 20 in the intake camshaft 2. The rotor 40 of the vane rotor 4 is provided with retard angle oil passages 46a to 46d communicating with the retard angle chambers 82, respectively. The retard angle oil passages 46 communicate with a retard angle oil passage 21 in the intake camshaft 2.

The first vane 41a is provided in the side surface thereof with a retard angle chamber hydraulic pressure inlet hole 47 communicating with the cylinder 43. The retard angle chamber hydraulic pressure inlet hole 47 opens to the first retard angle chamber 82a.

The advance angle oil passage 20 and the retard angle oil passage 21 in the intake camshaft 2 are connected to a hydraulic oil supply-discharge mechanism 7 provided outside the valve timing control apparatus 1. The hydraulic oil supply-discharge mechanism 7 includes an oil pump 70, a flow path switching valve 71, and a hydraulic circuit. The oil pump 70 is driven by power from the crankshaft.

The hydraulic circuit includes two systems of passages. That is, the hydraulic circuit includes an advance angle passage 72 for supplying and discharging hydraulic oil to and from the advance angle chambers 81, and a retard angle passage 73 for supplying and discharging hydraulic oil to and from the retard angle chambers 82. The advance angle passage 72 and the retard angle passage 73 are connected through the flow path switching valve 71 to a supply passage 74 connected to the oil pump 70 and a discharge passage 75 connected to an oil pan 76. The supply passage 74 is provided with a safety valve 77 that opens when the pressure in the supply passage 74 becomes equal to or larger than a predetermined value, thereby discharging hydraulic oil in the supply passage 74 into the oil pan 76.

The flow path switching valve 71 switches, by a solenoid 71d, the connection between the advance angle passage 72 and the retard angle passage 73, and the supply passage 74 and the discharge passage 75, between three states: a first state where the advance angle passage 72 and the supply passage 74 are connected and the retard angle passage 73 and the discharge passage 75 are connected; a second state where the advance angle passage 72 and the discharge passage 75 are connected and the retard angle passage 73 and the supply passage 74 are connected; and a third state where the advance angle passage 72 and the retard angle passage 73 are cut off from the supply passage 74 and the discharge passage 75.

[Details of Through-Holes Provided in Pulley]

The through-holes 64 are each provided radially outward with respect to each shoe 50 of the housing body 5. Each through-hole 64 is disposed between straight lines A and B respectively connecting the rotation center O of the pulley 6 and the circumferentially opposite ends of each shoe 50 (see FIG. 4).

The through-holes 64 are each provided at the outer peripheral side of the bolt 90. The through-holes 64 are provided so that the through-hole 64 and the bolt 90 line up in a radial direction as viewed from the X-axis direction.

The through-holes 64 are formed so that the opening of each through-hole 64 is in the shape of a slot extending in the circumferential direction of the pulley 6 as viewed from the X-axis direction.

The through-holes 64 are provided so that the inner periphery-side surfaces of the through-holes 64 are spaced apart from the outer peripheral surface of the housing body 5.

Figure 10:
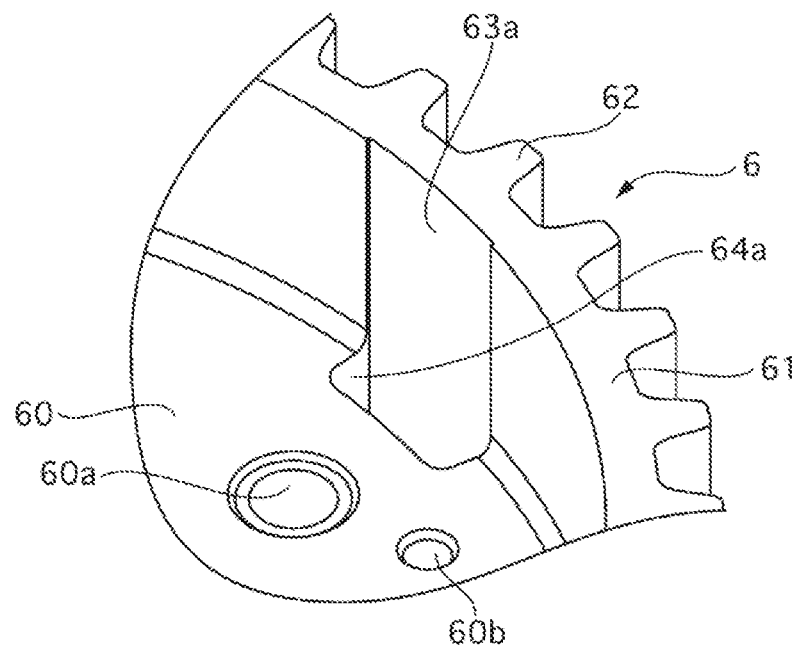
FIG. 10 is an enlarged view of a part of the pulley in the first embodiment, showing a through-hole.
Figure 11:
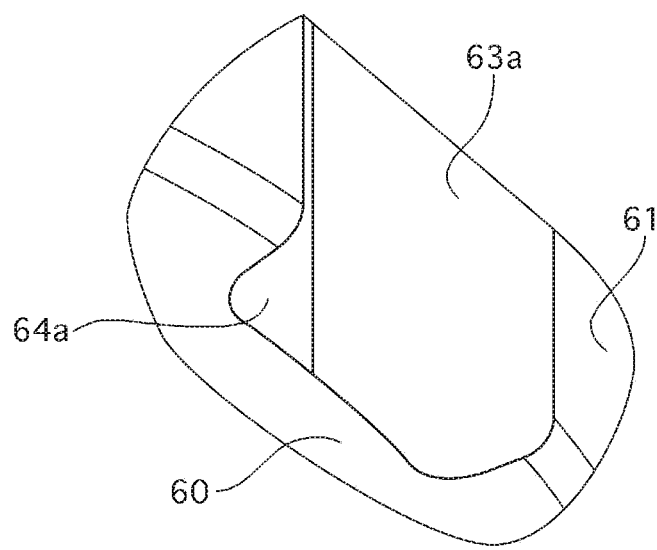
FIG. 11 is an enlarged view of the joint between a through-hole and a groove in the first embodiment.

FIG. 10 is an enlarged view of a part of the pulley 6, showing the through-hole 64a. FIG. 11 is an enlarged view of the joint between the through-hole 64a and the groove 63a. Although the through-hole 64a and the groove 63a are shown here in the enlarged view, the other through-holes 64 and grooves 63 respectively have approximately the same configurations as the through-hole 64a and the groove 63a.

The through-holes 64 are formed through the pulley 6 in the X-axis direction so as to extend over the cylindrical portion 61 and the bottom portion 60. The through-holes 64 are formed so that a part of each through-hole 64 is located radially outward with respect to the smallest diameter of the cylindrical portion 61 of the pulley 6. The through-holes 64 and the grooves 63 are connected without a step in the X-axis direction at the joints therebetween.

[Operation of Valve Timing Control Apparatus]

(When Oil Pump is at Rest)

The vane rotor 4 is biased counterclockwise, as viewed from the X-axis positive direction, relative to the pulley 6 by a spring (not shown). Accordingly, when the oil pump 70 is at rest and, consequently, no hydraulic oil is generated, the first vane 41*a* of the vane rotor 4 is abutting against the circumferentially right side of the first shoe 50*a* of the housing body 5 (most retarded position). At this time, the lock piston 44 is moved in the X-axis positive direction by the biasing force of the coil spring 44*a*, so that the distal end of the lock piston 44 engages the engaging recess 65 in the pulley 6. Thus, the rotation of the vane rotor 4 relative to the housing body 5 is restrained, thereby enabling suppression of fluttering of the vane rotor 4 at the time of starting the engine or the like.

(Advance Angle Control)

To perform advance angle control, the oil pump 70 is driven, and the flow path switching valve 71 is controlled to connect the advance angle passage 72 and the supply passage 74 and to connect the retard angle passage 73 and the discharge passage 75.

Consequently, hydraulic oil is supplied into the advance angle chambers 81, and hydraulic oil is discharged from the retard chambers 82. The first advance angle chamber 81*a* and the X-axis negative direction side of the lock piston 44 are in communication with each other through the advance angle chamber hydraulic pressure inlet groove 66, and the first retard angle chamber 82*a* and the X-axis positive direction side of the lock piston 44 are in communication with each other through the retard angle chamber hydraulic pressure inlet hole 47. Accordingly, the biasing force of hydraulic pressure acting on the X-axis negative direction side of the lock piston 44 exceeds the biasing force of hydraulic pressure acting on the X-axis positive direction side of the lock piston 44 plus the biasing force of the coil spring 44*a*, and the lock piston 44 moves toward the X-axis positive direction side. Consequently, the distal end of the lock piston 44 is disengaged from the engaging recess 65 in the pulley 6.

As a result, the hydraulic pressure in the retard angle chambers 82 becomes lower than the hydraulic pressure in the advance angle chambers 81. Consequently, the vane rotor 4 is pressed to rotate in the clockwise direction (advance angle direction) as viewed from the X-axis positive direction side.

(Retard Angle Control)

To perform retard angle control, the oil pump 70 is driven, and the flow path switching valve 71 is controlled to connect the retard angle passage 73 and the supply passage 74 and to connect the advance angle passage 72 and the discharge passage 75. Consequently, hydraulic oil is supplied into the retard angle chambers 82, and hydraulic oil is discharged from the advance angle chambers 81. As a result, the hydraulic pressure in the advance angle chambers 81 becomes lower than the hydraulic pressure in the retard angle chambers 82. Consequently, the vane rotor 44 is pressed to rotate in the counterclockwise direction (retard angle direction) as viewed from the X-axis positive direction side.

[Operation]

During assembly or a performance test of the valve timing control apparatus 1, hydraulic oil is flowed through the inside thereof. Thereafter, before shipment, air is blown into every gap to drain the residual hydraulic oil. In this regard, however, the space between the inner periphery of the cylindrical portion 61 of the pulley 6 and the outer periphery of the housing body 5, in particular, is a blind alley. Therefore, hydraulic oil collected in this space cannot easily be drained out.

Accordingly, in the first embodiment, the through-holes 64 are formed through the pulley 6 in the X-axis direction so as to extend over the bottom portion 60 and cylindrical portion 61 of the pulley 6. Thus, hydraulic oil is drained from the through-holes 64 by blowing air into the space between the inner periphery of the cylindrical portion 61 of the pulley 6 and the outer periphery side of the housing body 5 from the X-axis positive direction side. It is therefore possible to improve the hydraulic oil draining performance. In addition, it is possible to improve the performance of draining hydraulic oil collected in the corner between the bottom portion 60 and the cylindrical portion 61.

If the through-holes 64 are provided so as to be spaced apart from the cylindrical portion 61, i.e. if the bottom portion 60 is left between the through-holes 64 and the cylindrical portion 61, hydraulic oil is likely to remain in that region, and it is difficult to drain out the remaining hydraulic oil by using air. In contrast, if the through-holes 64 are formed so as to extend over the bottom portion 60 and cylindrical portion 61 as in the first embodiment, hydraulic oil can be drained out by blowing air in the circumferential direction into the space between the cylindrical portion 61 of the pulley 6 and the outer periphery of the housing body 5. Therefore, it becomes easy to drain out the hydraulic oil.

Further, in the first embodiment, the through-holes 64 are connected in the X-axis direction to the inner peripheral surface (grooves 63) of the cylindrical portion 61 without a step. Thus, the hydraulic oil draining performance can be improved.

Further, in the first embodiment, the through-holes 64 are formed so that a part of each through-hole 64 is located radially outward with respect to the smallest diameter of the cylindrical portion 61 of the pulley 6. With this structure, the through-holes 64 can be formed so as to expand closer to the outer periphery than the bottom portion 60. Accordingly, the pulley 6 can be reduced in weight.

Further, in the first embodiment, the through-holes 64 are each disposed between straight lines (straight lines A and B in FIG. 4) respectively connecting the rotation axis of the pulley 6 and the opposite ends of the associated shoe 50 in the circumferential direction of the housing body 5. At portions where the shoes 50 are provided, the shoes 50 seal between the operation chambers 80 and the outer peripheral area of the housing body 5. On the other hand, at portions where no shoes 50 are provided, the cylindrical portion 51 seals between the operation chambers 80 and the outer peripheral area of the housing body 5. The shoes 50 having a large area exhibit high sealing performance; therefore, there is less leakage of hydraulic oil from the operation chambers 80 at the outer peripheries of the shoes 50. The shoes 50 have bolt holes 53 formed therein, respectively, and the bolts 90 are inserted through the bolt holes 53 to jointly fasten the front plate 3, the housing body 5, and the pulley 6. It is therefore possible to further improve the sealing performance by the shoes 50. Accordingly, it is possible to suppress the discharge of hydraulic fluid through the through-holes 64 when the valve timing control apparatus 1 is being driven.

Further, in the first embodiment, the through-holes 64 are provided so as to be radially spaced apart from the outer peripheral surface of the housing body 5. By so doing, it is possible to ensure the mechanical strength of the bottom portion 60 of the pulley 6.

Further, in the first embodiment, the through-holes 64 are formed in the shape of slots extending in the circumferential direction of the pulley. With this configuration, the opening area of each through-hole 64 can be increased, and the hydraulic oil draining performance can be improved.

Further, in the first embodiment, the pulley 6 is formed by sintering, and the through-holes 64 are formed by using a sintering mold. Accordingly, the formation of the through-holes 64 can be facilitated.

Further, in the first embodiment, the front plate 3, the housing body 5, and the pulley 6 are jointly fastened with the bolts 90. Thus, it is possible to reduce the number of man-hours needed to manufacture the valve timing control apparatus 1.

Further, in the first embodiment, the through-holes 64 are located outward with respect to the bolts 90 in the radial direction of the pulley 6 and disposed so that each through-hole 64 and the associated bolt 90 line up in the radial direction of the pulley 6. With this configuration, the bolt fastening positions and the positions of the through-holes 64 are apart from each other; therefore, deformation of the through-holes 64 can be suppressed. In addition, an increase in weight caused by providing the bolts 90 can be reduced by the through-holes 64.

Further, in the first embodiment, the recesses 3b in the front plate 3 are formed with the bolt holes 30a to 30d, which are larger in diameter than the bolt holes 53a to 53d. The bolts 90 are hexalobular bolts, each having a head portion 901 abutting against an associated one of the recesses 3b in the front plate and an intermediate-diameter portion 903 inserted through an associated one of the bolt holes 30a to 30d and larger in diameter than the outer diameter of a threaded portion 902 thereof. Here, the head portions of the bolts 90 are configured to be accommodated within the recesses 3b, respectively, in the front plate 3 in the axial direction and not to abut against the spiral spring 95. Here, in order to form the bolts 90 so that the head portions 901 does not abut against the spiral spring 95, the head portions 901 need to be formed so as to have a low-head profile. In this regard, however, the wall thickness between the head portion 901 and threaded portion 902 may be reduced by forming a hexalobular hole in the head portion 901, and the mechanical strength may be reduced, depending on the size of the hexalobular hole. Therefore, the provision of the intermediate-diameter portion 903 makes it possible to ensure the wall thickness between the head portion 901 and the threaded portion 902 and to reduce the lowering of mechanical strength even if a hexalobular hole is formed in the head portion 901.

Further, the intermediate-diameter portions 903 are formed within the bolt holes 30a to 30d. Therefore, even if the front plate 3 is shifted during assembly, the intermediate-diameter portions 903 cannot reach the bolt holes 53a to 53d. Accordingly, excellent assemblability is exhibited. Further, with the above-described structure, the bolt holes 53a to 53d can be formed smaller in diameter than the intermediate-diameter portions 903, and it is therefore possible to suppress the reduction in strength of the shoes 50a to 50d of the housing body 5.

Although in the first embodiment the bolts 90 are hexalobular bolts, the bolts 90 may also be cross-recessed head bolts or hex socket head cap bolts.

[Advantageous Effects]

(1) The valve timing control apparatus includes: the housing body 5 formed in the cylindrical shape and having the plurality of shoes 50 projecting on the inner periphery side thereof; the vane rotor 4 including the vanes 41 projecting on the outer periphery side from the rotor 40 integrally rotating with the intake camshaft 5 of the internal combustion engine, and dividing the space between adjacent shoes 50 into the advance angle chamber 81 and the retard angle chamber 82; the pulley 6 including the cylindrical portion 61 formed in the cylindrical shape, configured such that rotation from the crankshaft is transmitted to the outer peripheral side thereof, and accommodating the housing body 5 at the inner peripheral side thereof, and the bottom portion 60 closing the one end side of the housing body 5 and to which the housing body 5 is secured; and the front plate 3 (plate) closing the other end side of the housing body 5. The pulley 6 has the through-holes 64 extending therethrough in the axial direction at respective positions radially outward with respect to the outer diameter of the housing body 5. The through-holes 64 are formed so as to extend over the bottom portion 60 and cylindrical portion 61 of the pulley 6.

With the structure in which the through-holes 64 are formed so as to extend over the bottom portion 60 and the cylindrical portion 61, hydraulic oil can be drained from the bottom portion 60 more easily than a structure in which the through-holes 64 are provided so as to be spaced apart from the cylindrical portion 61. Thus, the hydraulic oil draining performance can be improved.

(2) The through-holes 64 are formed so that at least a part of each through-hole 64 is located radially outward with respect to the smallest diameter of the inner periphery at the opening end of the cylindrical portion 61.

Accordingly, it is possible to improve the hydraulic oil draining performance and to reduce the weight of the pulley 6.

(3) The through-holes 64 are each disposed between the straight lines respectively connecting the rotation axis of the pulley 6 and the opposite ends of the associated shoe 50 in the circumferential direction of the housing body 5.

Accordingly, it is possible to suppress the degradation of sealing performance between the housing body 5 and the pulley 6 and to suppress the leakage of hydraulic fluid from the operation chambers 80 when the valve timing control apparatus 1 is being driven.

(4) The through-holes 64 are provided so as to be radially spaced apart from the outer peripheral surface of the housing body 5.

Accordingly, it is possible to ensure the mechanical strength of the bottom portion 60 of the pulley 6.

(5) The through-holes 64 are formed in the shape of slots extending in the circumferential direction of the pulley.

Accordingly, it is possible to increase the opening area of the through-holes 64 and hence possible to improve the hydraulic oil draining performance.

(6) The pulley 6 is formed by sintering, and the through-holes 64 are formed by using a sintering mold.

Accordingly, the formation of the through-holes 64 can be facilitated.

(7) The front plate 3, the housing body 5, and the pulley 6 are jointly fastened with the bolts 90.

Accordingly, the number of man-hours can be reduced.

(8) The through-holes 64 are located outward with respect to the bolts 90 in the radial direction of the pulley 6 and disposed so that each through-hole 64 and the associated bolt 90 line up in the radial direction the pulley 6.

Accordingly, deformation of the through-holes 64 can be suppressed. In addition, it is possible to suppress the leakage of hydraulic oil from the operation chambers 80 by providing the through-holes 64 at places where there is less influence of deformation of the pulley 6 caused by securing the bolts 90.

(9) The valve timing control apparatus includes: the housing body 5 formed in the cylindrical shape and having the plurality of shoes 50 projecting on the inner periphery side thereof; the vane rotor 4 including the vanes 41 projecting on the outer periphery side from the rotor 40 integrally rotating with the intake camshaft 5 of the internal combustion engine, and dividing the space between adjacent shoes 50 into the advance angle chamber 81 and the retard angle chamber 82; the pulley 6 including the cylindrical portion 61 formed in the cylindrical shape, configured such that rotation from the crankshaft is transmitted to the outer peripheral side thereof, and accommodating the housing body 5 at the inner peripheral side thereof, and the bottom portion 60 closing the one end side of the housing body 5 and to which the housing body 5 is secured; and the front plate 3 (plate) closing the other end side of the housing body 5. The pulley 6 has the through-holes 64 extending therethrough in the axial direction at respective positions radially outward with respect to the outer diameter of the housing body 5. The through-holes 64 are connected to the inner peripheral surface of the cylindrical portion 61 without a step in the rotation axis direction of the pulley 6. Thus, it is possible to improve the hydraulic oil draining performance.

Second Embodiment

In the first embodiment, the through-holes 64 are formed so that the opening of each through-hole 64 is in the shape of a slot extending in the circumferential direction of the pulley 6 as viewed from the X-axis direction. In the second embodiment, the through-holes 64 are formed so that the opening of each through-hole 64 is in the shape of a round hole as viewed from the X-axis direction.

The valve timing control apparatus 1 according to the second embodiment will be explained below. In the following explanation, the same elements as those of the valve timing control apparatus 1 according to the first embodiment are denoted by the same reference signs as those used in the first embodiment, and a description thereof is omitted.

Figure 12:
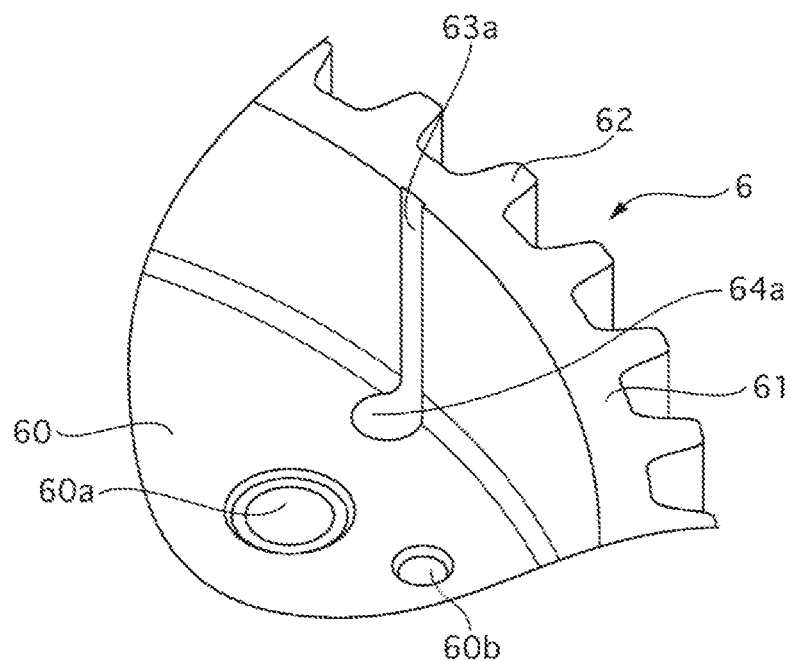
FIG. 12 is an enlarged view of the joint between a through-hole and a groove in a second embodiment.

FIG. 12 is an enlarged view of the joint between a through-hole 64a and a groove 63a. Although the through-hole 64a and the groove 63a are shown here in the enlarged view, the other through-holes 64 and grooves 63 respectively have approximately the same shapes as the through-hole 64a and the groove 63a.

The through-holes 64 are formed so that the opening of each through-hole 64 is in the shape of a round hole as viewed from the X-axis direction. The through-holes 64 are formed through the pulley 6 in the X-axis direction so as to extend over the cylindrical portion 61 and the bottom portion 60. The through-holes 64 are formed so that a part of each through-hole 64 is located radially outward with respect to the smallest diameter of the cylindrical portion 61 of the pulley 6. The through-holes 64 and the grooves 63 are connected without a step at the joints therebetween in the X-axis direction.

In the first embodiment, the through-holes 64 are formed by a sintering mold used to form the pulley 6 by sintering. In the first embodiment, the through-holes 64 are each in the shape of a round hole; therefore, the through-holes 64 can be formed easily by post-processing after the pulley 6 has been formed by sintering.

[Advantageous Effects]

(10) The through-holes 64 are each formed in the shape of the round hole. Accordingly, the through-holes 64 can be formed by post-processing after the pulley 6 has been formed by sintering.

Third Embodiment

In the first embodiment, the through-holes 64 are provided so that the inner periphery-side surfaces of the through-holes 64 are spaced apart from the outer peripheral surface of the housing body 5. In the third embodiment, the through-holes 64 are provided so that the inner periphery-side surfaces of the through-holes 64 overlap the outer peripheral surface of the housing body 5. The arrangement of the rest of the third embodiment is the same as the first embodiment. With the structure of the third embodiment, the opening area of each through-hole 64 can be increased; therefore, the hydraulic oil draining performance can be improved. In addition, it is possible to reduce the weight of the pulley 6.

[Advantageous Effects]

(11) The through-holes 64 are provided so as to radially overlap the outer peripheral surface of the housing body 5.

Accordingly, it is possible to improve the hydraulic oil draining performance and to reduce the weight of the pulley 6.

Other Embodiments

Although the present invention has been explained above on the basis of the first to third embodiments, the specific configuration of the present invention is not limited to the first to third embodiments. The present invention includes changes in design or other changes made without departing from the gist of the present invention.

Although the valve timing control apparatus 1 according to the first embodiment is provided on the intake camshaft 2, the valve timing control apparatus 1 may be provided on an exhaust camshaft.

Although the housing body 5 of the valve timing control apparatus 1 according to the first embodiment includes the cylindrical portion 51 and the shoes 50, which are integrally formed together, the cylindrical portion 51 and the shoes 50 may be formed as separate components.

Although the valve timing control apparatus 1 according to the first embodiment includes both the advance angle chamber 81 and the retard angle chamber 82, as the operation chambers 80 to and from which hydraulic oil is supplied and discharged, the valve timing control apparatus 1 may include only either the advance angle chamber 81 or the retard angle chamber 82.

Although the valve timing control apparatus 1 according to the first embodiment has four advance angle chambers 81 and four retard angle chambers 82, the number of these chambers is not limited to four. In other words, the number of shoes 50 and the number of vanes 41 are each not limited to four but may be another number.

In addition, the elements described in the claims and the specification can be optionally combined together or omitted within a range in which the above-mentioned problems are at least partially solved, or within a range in which at least a part of the advantages is achieved.

The present application claims priority to Japanese Patent Application No. 2015-130051 filed on Jun. 29, 2015. The entire disclosure of Japanese Patent Application No. 2015-130051 filed on Jun. 29, 2015 including the specification, the claims, the drawings and the summary is incorporated herein by reference in its entirety.

LIST OF REFERENCE SIGNS

2: intake camshaft; 3: front plate (plate); 4: vane rotor; 5: housing body; 40: rotor; 41: vane; 50: shoe; 60: bottom portion; 61: cylindrical portion; 80: operation chambers; 81: advance angle chamber; 82: retard angle chamber; 90: bolt.

The invention claimed is:

1. A valve timing control apparatus for an internal combustion engine, the valve timing control apparatus comprising:
   a housing body formed in a cylindrical shape, and including a plurality of shoes formed so as to project from an inner peripheral surface of the housing body;
   a vane rotor including a rotor configured to rotate integrally with a camshaft of the internal combustion engine, and a vane formed so as to project from an outer peripheral surface of the rotor and dividing a space between adjacent shoes of the plurality of shoes into an advance angle chamber and a retard angle chamber; and
   a pulley including a cylindrical portion formed in a cylindrical shape, configured such that rotation from a crankshaft is transmitted to an outer peripheral side of the pulley, and accommodating the housing body at an inner peripheral side of the pulley, and a bottom portion closing a first side of the housing body and to which the housing body is secured; and
   a plate closing a second side of the housing body,
   wherein the pulley includes a through-hole extending therethrough in a rotation axis direction of the pulley at a position radially outward with respect to an outer peripheral surface of the housing body,
   wherein the cylindrical portion includes a groove formed on an inner peripheral surface of the cylindrical portion, the groove extending in the rotation axis direction of the pulley, and
   wherein the groove is in communication with the through-hole.

2. The valve timing control apparatus of claim 1, wherein the through-hole is formed so that at least a part of the through-hole is located radially outward with respect to a smallest diameter of an inner peripheral surface of the cylindrical portion at an opening end.

3. The valve timing control apparatus of claim 2, wherein the through-hole is disposed between two straight lines respectively connecting a rotation axis of the pulley and circumferentially opposite ends of an associated shoe of the plurality of shoes.

4. The valve timing control apparatus of claim 3, wherein the through-hole is provided so as to be radially spaced apart from the outer peripheral surface of the housing body.

5. The valve timing control apparatus of claim 3, wherein the through-hole is provided at a position overlapping the outer peripheral surface of the housing body as viewed in a radial direction.

6. The valve timing control apparatus of claim 3, wherein the through-hole is formed in a shape of a slot extending in a circumferential direction of the pulley.

7. The valve timing control apparatus of claim 3, wherein the through-hole is formed in a shape of a round hole.

8. The valve timing control apparatus of claim 3, wherein the pulley is formed by sintering, and the through-hole is formed by using a sintering mold.

9. The valve timing control apparatus of claim 3, wherein the plate, the housing body, and the pulley are jointly fastened with a bolt.

10. The valve timing control apparatus of claim 9, wherein the through-hole is located outward with respect to the bolt in a radial direction of the pulley and disposed to line up with the bolt in the radial direction.

11. A valve timing control apparatus for an internal combustion engine, the valve timing control apparatus comprising:
    a housing body formed in a cylindrical shape, and including a plurality of shoes formed so as to project from an inner peripheral surface of the housing body;
    a vane rotor including a rotor configured to rotate integrally with a camshaft of the internal combustion engine, and a vane formed so as to project from an outer peripheral surface of the rotor and dividing a space between adjacent shoes of the plurality of shoes into an advance angle chamber and a retard angle chamber; and
    a pulley including a cylindrical portion formed in a cylindrical shape, configured such that rotation from a crankshaft is transmitted to an outer peripheral side of the pulley, and accommodating the housing body at an inner peripheral side of the pulley, and a bottom portion closing a first side of the housing body and to which the housing body is secured; and
    a plate closing a second side of the housing body,
    wherein the pulley includes a through-hole extending therethrough in a rotation axis direction of the pulley at a position radially outward with respect to an outer peripheral surface of the housing body, and
    wherein the through-hole is connected to an inner peripheral surface of the cylindrical portion without a step in the rotation axis direction of the pulley.

12. The valve timing control apparatus of claim 11, wherein the cylindrical portion includes a groove formed on the inner peripheral surface of the cylindrical portion, the groove extending in the rotation axis direction of the pulley, and
    the groove is in communication with the through-hole.

13. The valve timing control apparatus of claim 12, wherein the through-hole is disposed between two imaginary straight lines respectively connecting a rotation axis of the pulley and circumferentially opposite ends of an associated shoe of the plurality of shoes.

14. The valve timing control apparatus of claim 12, wherein the plate, the housing body, and the pulley are jointly fastened with a bolt.

15. A valve timing control apparatus for an internal combustion engine, the valve timing control apparatus comprising:
    a housing body formed in a cylindrical shape; and
    a pulley including a cylindrical portion formed in a cylindrical shape, configured such that rotation from a crankshaft is transmitted to an outer peripheral side of the pulley, and accommodating the housing body at an inner peripheral side of the pulley, and a bottom portion closing a first end side of the housing body and to which the housing body is secured,
    wherein the pulley includes a through-hole extending therethrough in a rotation axis direction of the pulley at a position radially outward with respect to an outer peripheral surface of the housing body, and wherein the cylindrical portion includes a groove formed on an inner peripheral surface of the cylindrical portion, the groove extending in the rotation axis direction of the pulley, and wherein the groove is in communication with the through-hole.

* * * * *